United States Patent
Ukra et al.

(10) Patent No.: US 10,926,812 B2
(45) Date of Patent: Feb. 23, 2021

(54) TAILGATE WITH MASS AND PERFORMANCE OPTIMIZED REINFORCEMENT STRUCTURE

(71) Applicant: TOYOTA MOTOR ENGINEERING & MANUFACTURING NORTH AMERICA, INC., Plano, TX (US)

(72) Inventors: Wasim Ukra, Canton, MI (US); Joshua L. Walsh, Ashland, WI (US); Erik R. Andersen, Ann Arbor, MI (US); Herbert Meingast, Ann Arbor, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 10 days.

(21) Appl. No.: 16/264,295

(22) Filed: Jan. 31, 2019

(65) Prior Publication Data
US 2020/0247483 A1 Aug. 6, 2020

(51) Int. Cl.
*B62D 33/027* (2006.01)
*B62D 29/00* (2006.01)

(52) U.S. Cl.
CPC ......... *B62D 33/0273* (2013.01); *B62D 29/00* (2013.01)

(58) Field of Classification Search
CPC .. B62D 33/0273; B62D 33/027; B62D 33/03; B60J 5/02; B60J 5/10; B60J 5/101; B60J 5/102; B60J 5/107; B60J 5/108

USPC ....... 296/56, 57.1, 146.8, 106, 50; 52/793.1, 52/793.11
See application file for complete search history.

(56) References Cited

U.S. PATENT DOCUMENTS

| | | | |
|---|---|---|---|
| 1,439,439 A * | 12/1922 | Nyman | E06B 3/827 52/784.13 |
| 5,944,373 A | 8/1999 | Seksaria et al. | |
| 6,672,642 B1 | 1/2004 | Seksaria et al. | |
| 8,979,161 B2 * | 3/2015 | Patterson | B60J 5/107 296/50 |
| 9,789,912 B1 | 10/2017 | Marchlewski et al. | |
| 2003/0110705 A1* | 6/2003 | Hlavach | B60J 5/103 49/501 |
| 2015/0375804 A1* | 12/2015 | Gray | B62D 33/0273 296/186.3 |
| 2016/0194034 A1* | 7/2016 | Emura | B62D 25/025 296/209 |

* cited by examiner

*Primary Examiner* — Dennis H Pedder
(74) *Attorney, Agent, or Firm* — Haynes and Boone, LLP (57) ABSTRACT

A tailgate for a vehicle having structural strength and stiffness may include an outer panel, an inner panel facing the outer panel, a top boundary extending between the outer panel to the inner panel, a bottom boundary extending between the outer panel to the inner panel, a left boundary extending between the outer panel to the inner panel, a right boundary extending between the outer panel to the inner panel, and a volume of space defined within the inner panel, bottom boundary, outer panel, top boundary, left boundary, and right boundary. A plurality of bulkheads may be disposed within the volume of space, each bulkhead of the plurality of bulkheads extending in a linear direction a complete distance between the bottom boundary and the top boundary of the inner panel in a manner providing strength and stiffness to the outer and inner panels.

18 Claims, 10 Drawing Sheets

TAILGATE WITH MASS AND PERFORMANCE OPTIMIZED REINFORCEMENT STRUCTURE

TECHNICAL FIELD

The subject matter described herein relates to tailgates and structure for reinforcing tailgates. More particularly, the subject matter described herein relates to a mass and performance optimized tailgate reinforcement structure.

BACKGROUND

Pickup trucks include a tailgate which opens and closes access to the truck bed. When open, the tailgate forms a horizontal platform at the same level as the truck bed. While loading cargo, users often slide materials across the open tailgate and into the bed, or stack materials on the tailgate for a period of time. Similarly, users may stack or brace material across the closed tailgate. Thus, the tailgate must be strong enough to carry substantial loads without crushing, buckling, or otherwise permanently deforming. However, a solid tailgate would be either too thin or too heavy to be practical, or both. Thus, tailgates are hollow, with an inner panel and an outer panel separated by a reinforcement structure.

Current tailgate reinforcement structures primarily strengthen the tailgate laterally across the vehicle width, with longitudinal reinforcement at the either end and some longitudinal bracing (i.e., vertical when the tailgate is closed, or longitudinal when the tailgate is open) to the lateral reinforcement. Existing structures typically make use of the main reinforcement spar that runs along the tailgate in the lateral direction. These tailgates may have one or more of these lateral reinforcement spars running across the width of the tailgate. However, by nature these lateral spars are heavy, and may not provide adequate support, strength, or stiffness in all directions. Due to the amount of material involved, they may also be costly.

It is to be appreciated that such commonly used tailgate reinforcements can be improved in multiple variables, including weight, strength, durability, cost, vibration, and otherwise. Accordingly, long-felt needs exist for tailgate reinforcement structures that address the forgoing and other concerns.

The information included in this Background section of the specification, including any references cited herein and any description or discussion thereof, is included for technical reference purposes only and is not to be regarded as subject matter by which the scope of the disclosure is to be bound.

SUMMARY

Disclosed is a mass and performance optimized tailgate reinforcement structure, and tailgate incorporating such structure. A tailgate for a vehicle having structural strength and stiffness comprises an outer panel, an inner panel facing the outer panel, a top boundary extending between the outer panel to the inner panel, a bottom boundary extending between the outer panel to the inner panel, a left boundary extending between the outer panel to the inner panel, a right boundary extending between the outer panel to the inner panel, a volume of space defined within the inner panel, bottom boundary, outer panel, top boundary, left boundary, and right boundary, and a plurality of bulkheads disposed within the volume of space, each bulkhead of the plurality of bulkheads extending in a linear direction a complete distance between the bottom boundary and the top boundary of the inner panel in a manner providing strength and stiffness to the outer and inner panels, wherein each bulkhead of the plurality of bulkheads comprises an inner edge that abuts against the inner panel, an outer edge that abuts against the outer panel, a bottom edge that abuts against the bottom boundary, a top edge that abuts against the top boundary, and one or more attachment flanges positioned on one or more of the inner, outer, bottom, or top edges, by which said each bulkhead may be attached to one or more of the inner panel and outer panel.

In some embodiments, the tailgate further comprises a plurality of laterally oriented stiffening beads disposed within a surface of the inner panel. In some embodiments, at least one of the plurality of bulkheads is placed proximate to a predicted load path for at least one customer loading scenario. In some embodiments each of the plurality of bulkheads includes solid material in a predicted load path for at least one customer loading scenario. In some embodiments, the tailgate further comprises a pattern of stiffening beads or struts and lightening holes within one or more of the plurality of bulkheads. In some embodiments, the lightening holes occur outside a predicted load path for at least one customer loading scenario. In some embodiments, the plurality of bulkheads are attached to the outer panel or inner panel by welds, solder, bolts, screws, rivets, clips, adhesives, friction fit, or interference fit. In some embodiments, the plurality of bulkheads are formed as part of one or more of the inner panel, outer panel, and top boundary. In some embodiments, the tailgate further comprises one or more straps that sit flush against the inner or outer panel and reach substantially from the left boundary to the right boundary, or a portion thereof. In some embodiments, the tailgate further comprises one or more lateral braces positioned flush against the inner or outer panel, such that each lateral brace is flush against two of the plurality of bulkheads.

Some embodiments comprise a method for reinforcing a tailgate, comprising performing a first load path analysis on a hypothetical solid tailgate for one or more customer loading scenarios, to identify a critical load path, wherein the critical load path comprises one or more pathways, placing one or more vertically or longitudinally oriented bulkheads between an inner panel and an outer panel of a tailgate proximate to one or more of the pathways of the critical load path in the hypothetical solid tailgate, placing additional vertically or longitudinally oriented bulkheads between the inner panel and the outer panel in sufficient number to add a desired level of strength or stiffness along one or more desired axes, performing a second load path analysis on the tailgate with the vertically or longitudinally oriented bulkheads included, based on the second load path analysis, identifying regions of high stress and regions of low stress within each of the vertically or longitudinally oriented bulkheads, and placing lightening holes in the regions of low stress, such that a mass of the tailgate is reduced, and such that the tailgate meets the desired level of strength or stiffness along the one or more desired axes. In some embodiments, one or more of the one or more vertically or longitudinally oriented bulkheads comprise one or more stiffening beads along one or more faces of the one or more of the bulkheads. In some embodiments, the method further comprises placing one or more lateral braces positioned flush against the inner or outer panel and flush against two or more of the one or more vertically or longitudinally oriented bulkheads.

Some embodiments comprise a system for reinforcing a tailgate, comprising an outer panel, an inner panel, a top boundary, a bottom boundary, a left boundary, a right boundary, a volume of space defined within the inner panel, bottom boundary, outer panel, top boundary, left boundary, and right boundary, a plurality of bulkheads disposed within the volume of space and reaching from the bottom boundary to the top boundary of the inner panel, wherein positions of one or more of the bulkheads are proximate to a predicted load path, and wherein each bulkhead comprises a plurality of inner edges that fit against the inner panel, a plurality of outer edges that fit against the outer panel, a bottom edge that fits against the bottom boundary, a top edge that fits against the top boundary, and one or more stiffening beads along one or more of the inner or outer edges.

In some embodiments, the system further comprises a pattern of stiffening beads or struts and lightening holes within one or more bulkheads of the plurality of bulkheads, wherein positions of the lightening holes are not within the predicted load path. In some embodiments, the system further comprises one or more attachment flanges positioned on one or more of the edges of one or more bulkheads of the plurality of bulkheads, by which the one or more bulkheads may be attached to one or more of the inner panel, outer panel, the top boundary, and the bottom boundary. In some embodiments, the plurality of bulkheads is attached to the outer panel or inner panel by welds, solder, bolts, screws, rivets, clips, adhesives, friction fit, or interference fit, or are formed as part of one or more of the inner panel and outer panel. In some embodiments, the system further comprises one or more of straps positioned flush against the inner or outer panel and reach substantially from the left boundary to the right boundary, and one or more lateral braces positioned flush against the inner or outer panel, such that each lateral brace is flush against two of the plurality of bulkheads. In some embodiments, the system further comprises a plurality of laterally oriented stiffening beads disposed within a surface of the inner panel. In some embodiments, a shape of each bulkhead is such that each bulkhead fits flush against both the inner panel and outer panel.

The tailgate reinforcement structure disclosed herein may have particular, but not exclusive, utility for decreasing the weight of, strengthening, and stiffening pickup truck tailgates, or decreasing the weight of tailgates without a decrease in structural strength or stiffness.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the mass and performance optimized tailgate reinforcement structure, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

The present disclosure is generally directed to tailgates generally, and in some implementations, lightweight truck tailgate reinforcement structures based on an optimal load path and given design and manufacturing constraints based on selected customer loading scenarios. Novel tailgates or reinforcement structure for tailgates are proposed which involve bulkheads placed vertically (the orientation when the gate is closed) or longitudinally (the orientation when the gate is open and generally parallel to a longitudinal axis of the vehicle) across the tailgate, often without the need for additional lateral support. These bulkheads may be further optimized to reduce mass by carefully placed lightening holes where possible. The number of bulkheads may depend on the width of the tailgate and its performance requirements.

These descriptions are provided for exemplary purposes only, and should not be considered to limit the scope of the mass and performance optimized tailgate reinforcement structure. Certain features may be added, removed, or modified without departing from the spirit of the claimed subject matter.

Figure 1:
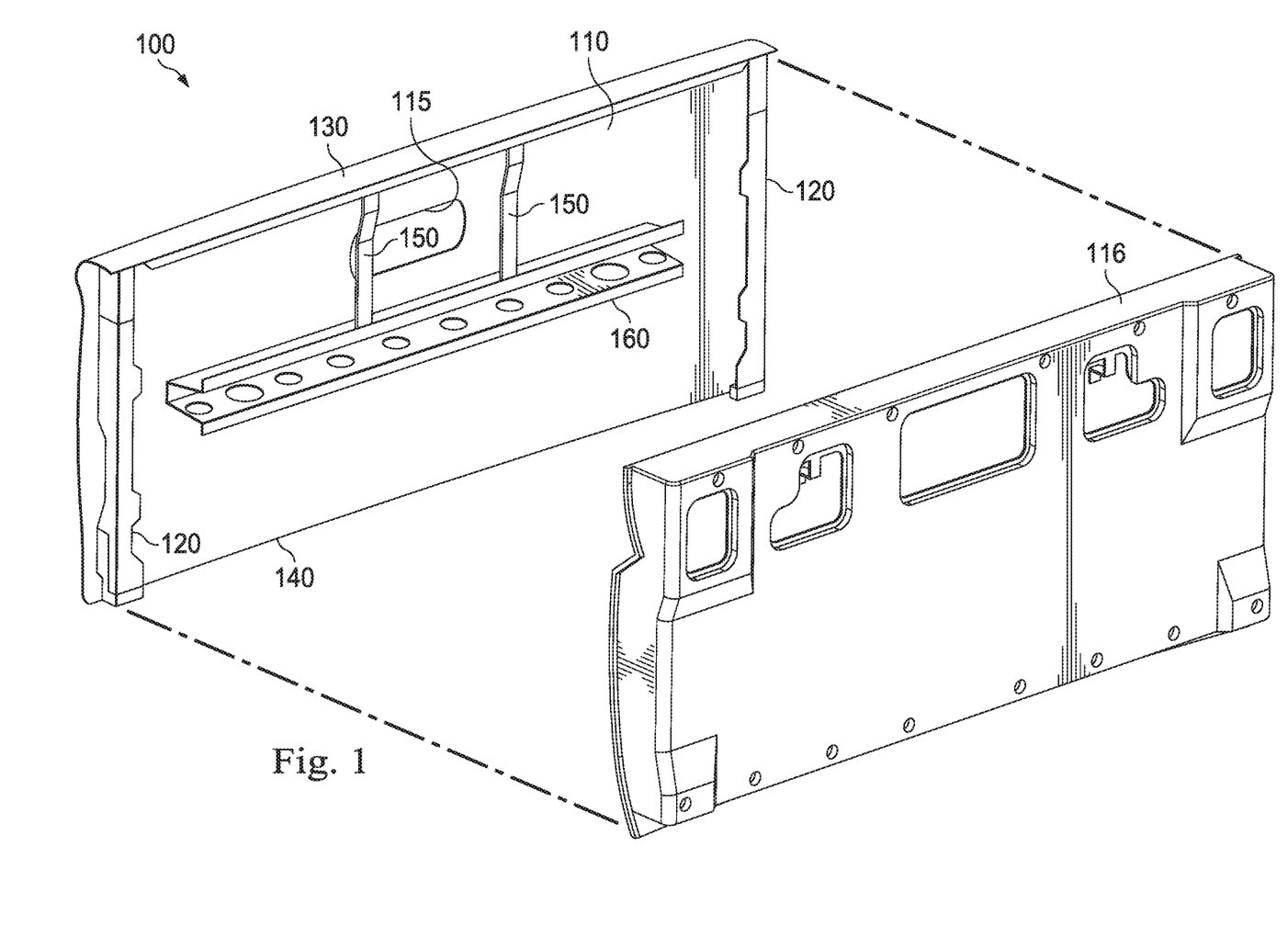
FIG. 1 is an exemplary representation of a partially exploded tailgate having reinforcement structure in accordance with the related art.

FIG. 1 is an exemplary representation of a tailgate 100 in a partially exploded configuration showing reinforcement structure in accordance with the related art. The structure comprises an outer panel 110 and an inner panel 116. The outer panel 110 includes a latch handle aperture 115. The structure further comprises edge braces 120, a top lip 130, a bottom lip 140, two vertical interior braces 150, and a laterally oriented spar 160. Variations on this basic design exist, but even in such variations the laterally oriented spar 160 is responsible for carrying and transferring a large and often dominant share of the structural load in typical or plausible customer loading scenarios.

The laterally oriented spar 160 is typically made of steel, and may be attached to the inner panel 116 and the outer panel 110. The spar 160 may not always provide adequate vertical or longitudinal support when material (e.g., pipes or lumber whose length exceeds the dimensions of the truck bed) is loaded on top of a closed tailgate, or when heavy material is slid across or stacked on top of the open tailgate, or when something is loaded on the open tailgate while driving (e.g., ATVs, motorcycles). This tailgate 100 also may not provide adequate stiffness under typical or plausible shock and vibration scenarios.

In an example, the hinge and lock area around the latch handle aperture 115 may be reinforced by the vertical braces 150. The inner panel 116 will be assembled to the outer panel, creating a volume of space between the inner panel 116 and outer panel 110 which the other structural components occupy. In an example, the patterning of the inner panel is somewhat arbitrary.

Before continuing, it should be noted that the examples described above are provided for purposes of illustration, and are not intended to be limiting. Other devices and/or device configurations may be utilized to carry out the operations described herein.

Figure 2:
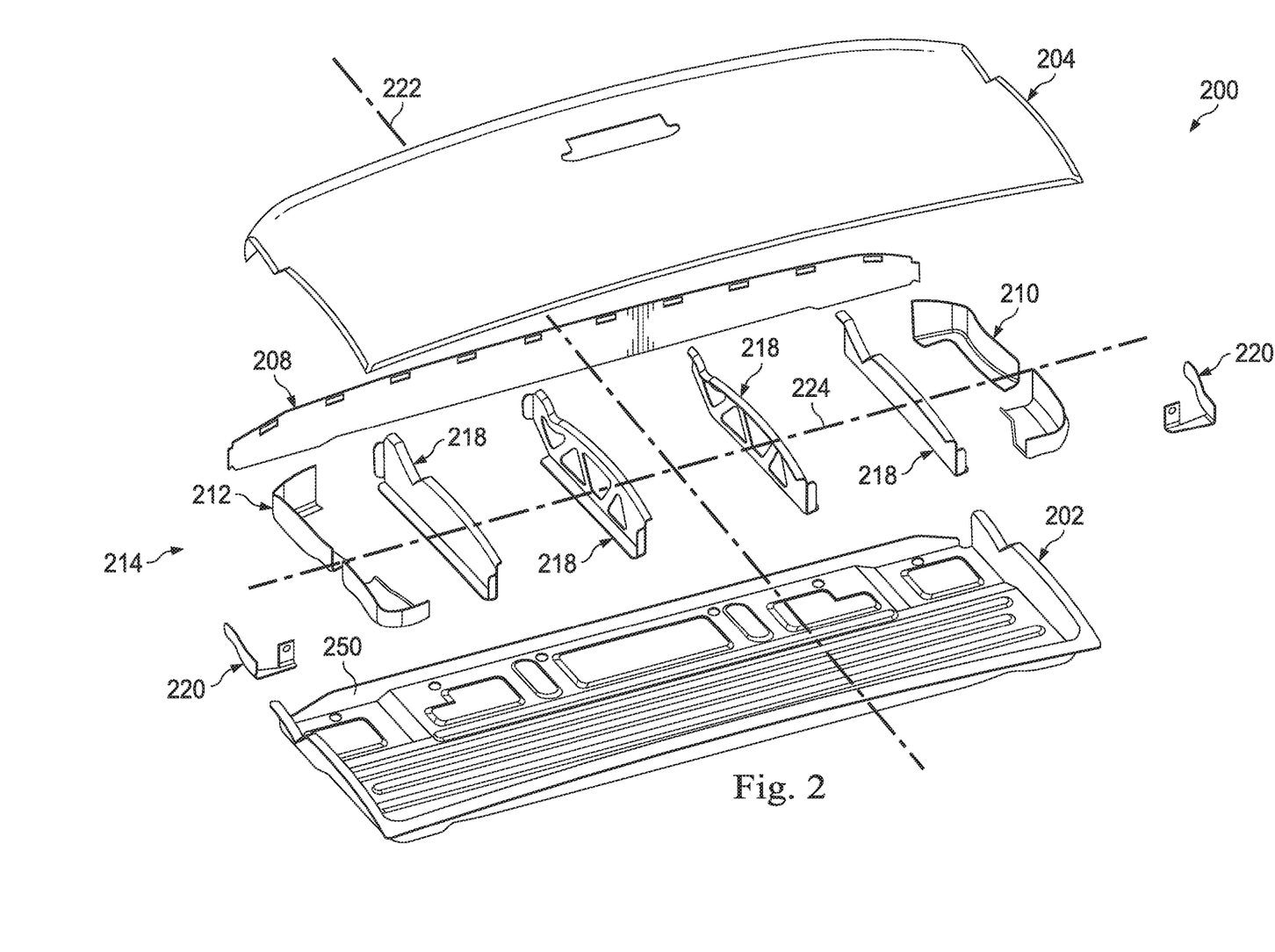
FIG. 2 is an exemplary representation of an exploded tailgate having reinforcement structure in accordance with at least one embodiment of the present disclosure.

FIG. 2 is an exemplary representation of a tailgate 200 having a unique reinforcement structure in accordance with at least one embodiment of the present disclosure. The tailgate 200 includes, in this example, an inner panel 202, an outer panel 204 with a bottom lip 206, and a top panel 208. In some implementations, the inner panel 202, the outer panel 204, and the top panel 208 are formed sheet-metal bent, folded, cut, or stamped to provide the profile and most exterior surfaces of the tailgate 200. In an unexploded configuration, the bottom lip 206 and the top panel 208 extend between and connect the inner panel 202 and the outer panel 204. The bottom lip 206 may be formed as a bend in the sheet-metal structure of the inner panel 202, but may also be formed as a part of the outer panel 204. In this implementation, the top panel 208 may be a separate sheet-metal structure attachable to the inner panel 202 and the outer panel 204 using welding, fasteners, or other attachment methods. In some implementations, the bottom lip 206 may be formed as a separate bottom panel connecting the inner panel 202 and the outer panel 204 in a manner similar to that of the top panel 208. Likewise, in some implementations, the top panel may be formed from a bend in the inner panel 202 or the outer panel 204, and therefore may not be a separate and independent sheet.

A vertical edge brace 210 and an opposing vertical edge brace 212 extend from the bottom lip 206 to the top panel 208 and are disposed at opposing lateral edges of the inner panel 202 and the outer panel 204. The inner panel 202, the outer panel 204, the bottom lip 206, the top panel 208, and the vertical edge braces 210, 212 cooperate to form a cavity or hollow space within the tailgate 200. That is, the bottom lip 206, the top panel 208, and the vertical edge braces 210, 212 each form a boundary that helps define a volume of space between the inner panel 202 and the outer panel 204.

The tailgate 200 also includes tailgate reinforcement structure, generally referenced herein by the numeral 214. The tailgate reinforcement structure 214 includes a plurality of components including the vertical edge braces 210, 212, and a plurality of bulkheads 218. Hinges 220 are connectable to the vertical edge braces and/or the inner panel 202 or outer panel 204 and the vehicle (not shown) to allow the tailgate 200 to pivot between open and closed positions.

For reference purposes, FIG. 2 also includes a vertical or longitudinal axis 222 and a horizontal or lateral axis 224. In implementations where the tailgate 200 pivots downward from a closed position to the open position, the vertical axis 222 may align with the longitudinal axis of the vehicle. The lateral axis 224 may extend from side to side of the tailgate 200.

In some embodiments, the inner panel 202 may be assembled from multiple pieces. In some embodiments, the inner panel 202 may include a cover.

Figure 3:
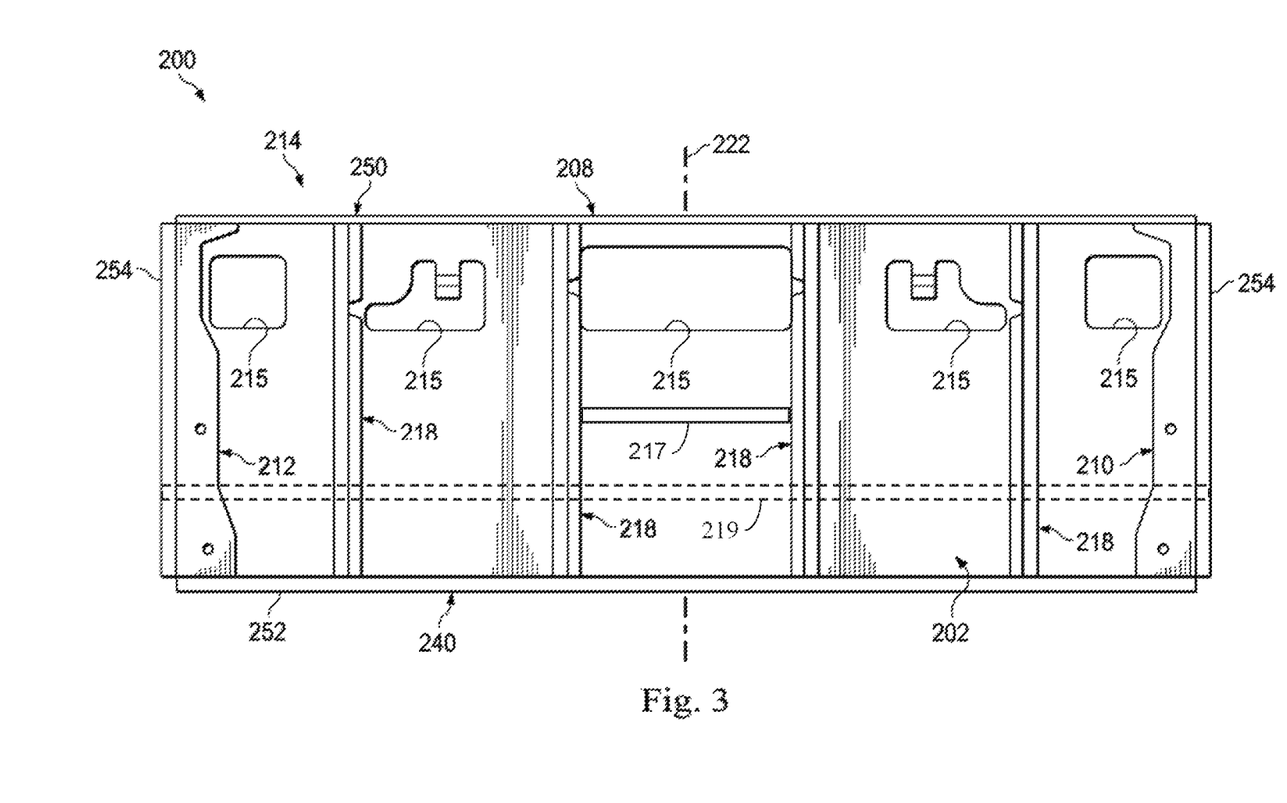
FIG. 3 is an exemplary representation of a tailgate reinforcement structure in accordance with at least one embodiment of the present disclosure.

FIG. 3 is an exemplary representation of a portion of the tailgate 200 including the inner panel 202 and the tailgate reinforcement structure 214 in accordance with at least one embodiment of the present disclosure. In this implementation, the inner panel 202 may include apertures 215 for latch handles, assembly access to wiring harnesses and lock assemblies, and otherwise. The inner panel 202 may include a top edge 250, a bottom edge 252 including the bottom lip 206, and 2 lateral side edges 254. Across the top edge 250 of the inner panel 202 is the top panel 208. In place of the spar 160 and braces 150 seen in FIG. 1, the proposed novel reinforcement architecture includes a plurality of vertically oriented bulkheads 218 that span the height of the tailgate 200 in the longitudinal direction in a repetitive pattern, providing a more optimized load transfer and thus allowing for a lighter tailgate reinforcement structure and therefore a lighter tailgate overall. In an example, the bulkheads 218 are laterally spaced evenly or approximately evenly across the width of the tailgate 200, and the number of bulkheads 218 may be determined by the width of tailgate and performance requirements. For example, if a given loading scenario requires the bulkhead structure to support 700 kg in a given position or positions on the open tailgate, and each bulkhead is capable of supplying approximately 200 kg of support, then a minimum of four bulkheads may be used. Bulkheads are also required to minimize unsupported areas within the tailgate.

The embodiment in FIG. 3 includes four bulkheads, laterally spaced along the inner panel 202. As can be seen, the bulkheads 218 extend linearly, in a direction substantially parallel to the longitudinal or vertical axis 222 or within about 30 degrees of parallel to the longitudinal axis. The bulkheads extend from the top of the tailgate 200, identified as the top edge 250, to the bottom of the tailgate 200, identified as the lower edge 252. In the example shown, the tailgate 200 is devoid of laterally extending structures. Rather, each bulkhead 218 extends individually in a linear manner the longitudinal length of the tailgate 200.

In some embodiments, the tailgate reinforcement structure 214 may include carefully positioned, laterally oriented braces or reinforcements 217 that may extend partially or fully in the lateral direction. Such lateral braces 217 may extend between and fit flush against or may abut two adjacent bulkheads 218. Alternatively, added strength or stiffness could be supplied by running one or more straps 219 (e.g., steel straps) laterally across the entire width of the inner panel 202 or outer panel 204 as a secondary reinforcement in addition to the bulkheads 218.

Figure 4:
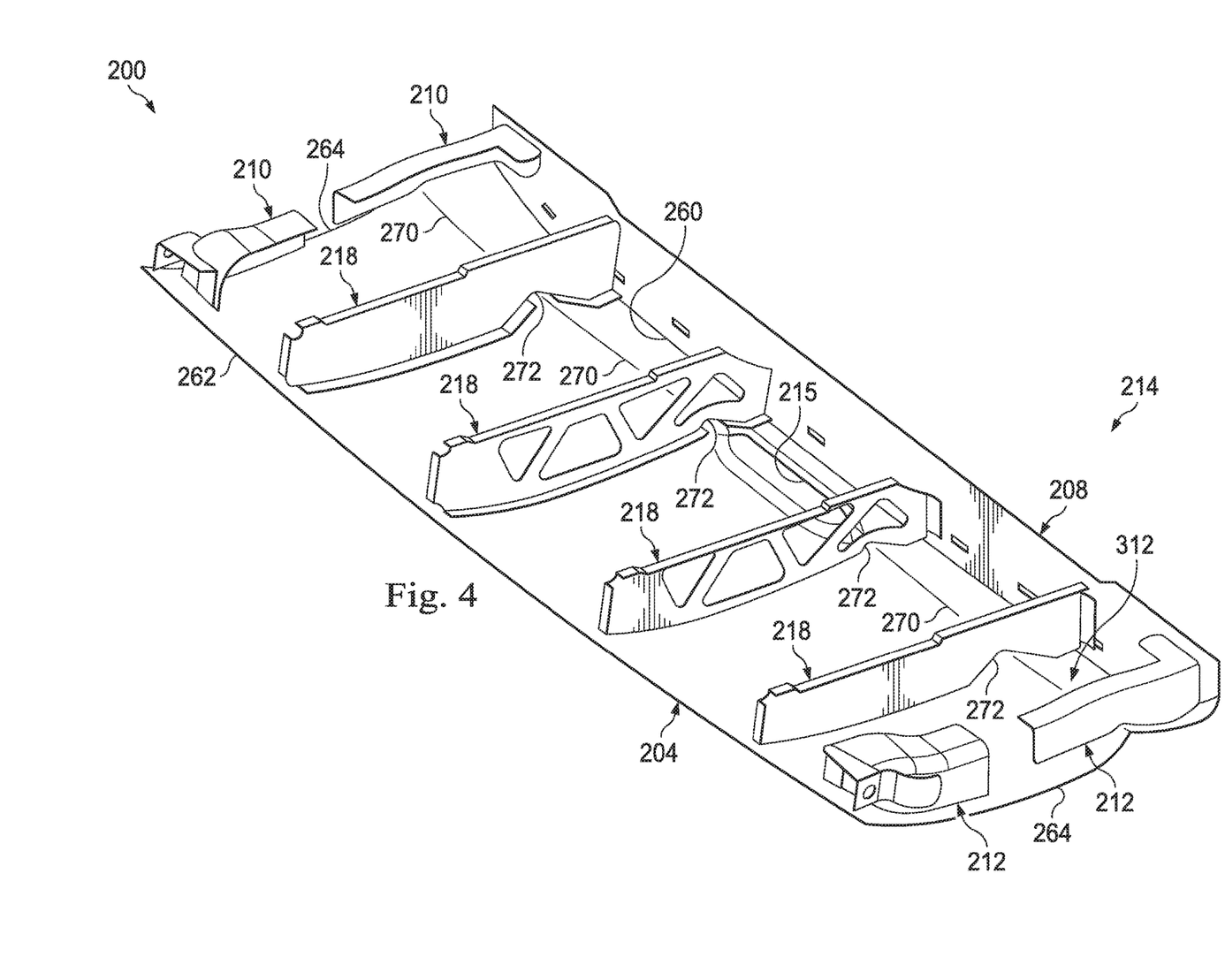
FIG. 4 is an exemplary representation of a tailgate reinforcement structure in accordance with at least one embodiment of the present disclosure.

FIG. 4 is an exemplary representation of a portion of the tailgate 200 including the outer panel 204 and the tailgate reinforcement structure 214 in accordance with at least one embodiment of the present disclosure. Visible are the bulkheads 218, the vertical edge braces 210, 212, and the top panel 208. As can be seen, in this implementation the top panel 208 extends in the lateral direction along the entire lateral width of the outer panel 204. It may also include bends, features, or formed ribs, that promote bending resistance and provide strength and stability to the top panel 208, which in turn may provide stability to the outer panel 204 and ultimately the tailgate 200. Also visible is the outer panel 204 which includes a handle aperture 215, a top edge 260, a bottom edge 262, side edges 264, and a number of concave aesthetic styling features 270. Concave and convex styling features 270 are not present in all vehicle tailgate outer panels 204, but occur frequently, with exact forms that may vary significantly between vehicle models and between model years for the same vehicle model. In the example shown in FIG. 4, the styling features 270 necessitate notches 272 in each of the bulkheads 218 to accommodate the shape of the styling features. In this example, the edges of the bulkheads 218 that fit flush against the outer panel 204 also include a gentle curve that follows the curving shape of the outer panel 204. In this regard, the shapes of the bulkheads 218 are both defined and constrained by the shapes and positions of the inner panel 202, outer panel 204, top panel 208, and bottom lip 206.

In an example, the bulkheads 218 are attached to the inner panel 202, bottom lip 206, and top panel 208 by welds, and to the outer panel 204 with a mastic adhesive, although other attachment types may be employed. The vertical edge braces 210, 212, also may be attached to the inner panel 202, the outer panel 204, the top panel 208, and bottom lip 206 via welding, adhesive, or other fastener.

As seen in FIGS. 2-4, the vertical edge brace 210 and the vertical edge brace 212 are disposed along the side edges 254 of the inner panel 202 and the side edges to 64 of the outer panel 204. These vertical edge braces 210 extend in the longitudinal direction from the top edges 250, 260 to the bottom edges 252, 262 of the inner panel 202 and the outer panel 204. These vertical edge braces provide stability and structure to the tailgate 200, as well as reinforcement to the hinge and lock. In some implementations, the vertical edge braces 210, 212 are structured to accommodate tailgate latching components, the hinges 220, and other features that enable the tailgate 200 to interface with a truck bed or other portion of the vehicle. In some implementations, the vertical edge braces are formed in multiple parts, as is shown in FIG. 2. In yet other embodiments, the vertical edge braces formed as single parts.

Figure 5:
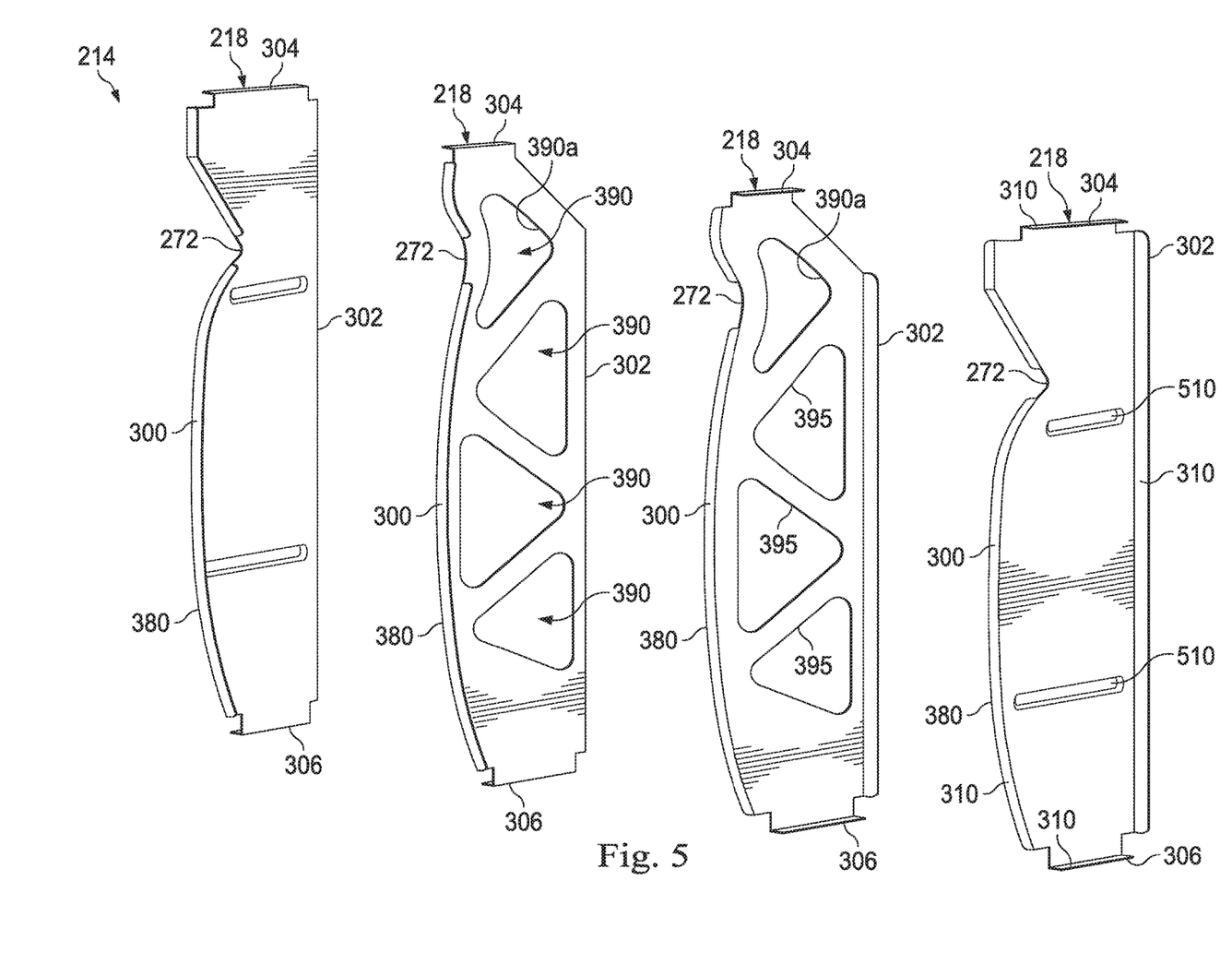
FIG. 5 is an exemplary representation of a tailgate reinforcement structure in accordance with at least one embodiment of the present disclosure.

FIG. 5 is an exemplary representation of a portion of the tailgate reinforcement structure 214 in accordance with at least one embodiment of the present disclosure. In FIG. 5, only the bulkheads 218 are depicted. The bulkheads 218 each have an outer edge 300 that shaped and configured to face the outer panel 204, an inner edge 302 that faces the inner panel 202, a top edge 304 that faces the top panel 208, and a bottom edge 306 that faces the bottom lip 206. As can be seen, in this example the bulkheads each include attachment flanges 310 on the top, bottom, inner, and outer edges by which they can be attached to the inner panel 202, outer panel 204, bottom lip 206, and top panel 208 with welds, solder, bolts, screws, rivets, clips, adhesives, friction fit, or interference fit. Alternatively, the bulkheads 218 may be formed as a single piece with one or both of the inner and outer panels 202, 204 or top panel 208.

Additionally, the bulkheads 218 in FIG. 5 each include the notches 272 to accommodate outer panel styling features 270 (see FIG. 3). These notches 272 accommodate an aesthetic design. The shape of the bulkheads 218 will be optimized based on the shape required to fit flush against, and attach to, the inner panel 202, outer panel 204, top panel 208, and bottom lip 206.

The bulkheads may optionally include other notches or through holes (not pictured) to accommodate items such as wiring harnesses, tailgate latching rods or lock rods, and other items whose shape and position may be model-dependent and model-year dependent.

In some examples, each of the bulkheads 218 may include stiffening beads or embosses 510 along the faces of the bulkheads 218 that that run substantially perpendicular to the long axis of the bulkheads 218, wherein the pattern of stiffening beads or embosses serves to increase the strength and stiffness of the bulkheads 218. At this point, the number and position of the bulkheads 218 can be adjusted based on the optimal load path as determined by topological analysis employing finite element analysis (FEA) under various customer loading scenarios.

Once the number and position of the bulkheads 218 have been determined, the bulkheads 218 may be further optimized by analyzing the stresses in the material with an additional FEA modeling step. In areas with little or no stress, lightening holes 390 may be defined where material is removed from the design of a bulkhead 218 as part of the structural design process. In areas with significant stress, material (e.g., steel or aluminum) is maintained within the structure, thus defining a pattern of struts 395.

In FIG. 5, two of the bulkheads 218 include lightening holes 390, while two of the bulkheads 218 do not include lightening holes 390. In the example shown, the bulkheads 218 include four lightening holes 309. These are formed in a relatively triangular shape. As can be seen, the lightening holes 309a are disposed adjacent the notches 272. Accordingly, one side of the relatively triangular lightening holes 309a is formed with an arc to accommodate the notches 272.

As can be seen in FIG. 5, the lightening holes 390 within a given bulkhead may all not generally be of the same size or shape as one another, and the lightening holes 390 will not necessarily be similar between different bulkheads occupying different positions in the predicted load path. Furthermore, depending on the implementation, some bulkheads may not include lightening holes at all.

The precise example structure shown in FIG. 5 may not necessarily be optimal for different loading scenarios, load paths, and tailgate widths, although other implementations may be generally similar. In an example, as compared with the baseline tailgate reinforcement structure 100 depicted in FIG. 1, a tailgate reinforcement structure 214 according to an embodiment of the present invention yields comparable structural performance (within <1 mm of permanent deflection after unloading customer loading scenarios), while being approximately 15-30% less massive. Similar improvements may be achieved in other metrics such as stiffness, durability, cost, impact tolerance, and vibration tolerance. Because the tailgate reinforcement structure 214 of the present disclosure places material along the optimal load path, it may be more tunable than the baseline reinforcement structure 100 so that, for example, a change in gauge or material grade has a more direct and more substantial effect on the strength of the tailgate under various customer loading scenarios. This allows further optimization of inner and outer panel gauges (i.e., downgauging), thus further lightening the tailgate.

In an example, the bulkheads 218 are joined to the inner panel 202 and top panel 208 (e.g., with welds), and follow the styling contour of the outer panel 202 (see FIG. 4), to which they are attached (e.g., with a mastic adhesive). In some implementations, the outer edge 300 of the bulkhead 218 may be curved or shaped as an arc, while the opposing inner edge 302 may be substantially vertical. The interface of the bulkhead 218 to the outer panel 204 may be welded where possible (e.g., below the visible surface of the top panel 208 if a spoiler is present to conceal the welds), although the bulkheads 218 may elsewhere be joined to the outer panel 202 by a mastic type adhesive. It is noted that the flanges 310 may serve to stiffen the structure of the bulkheads 218.

Figure 6:
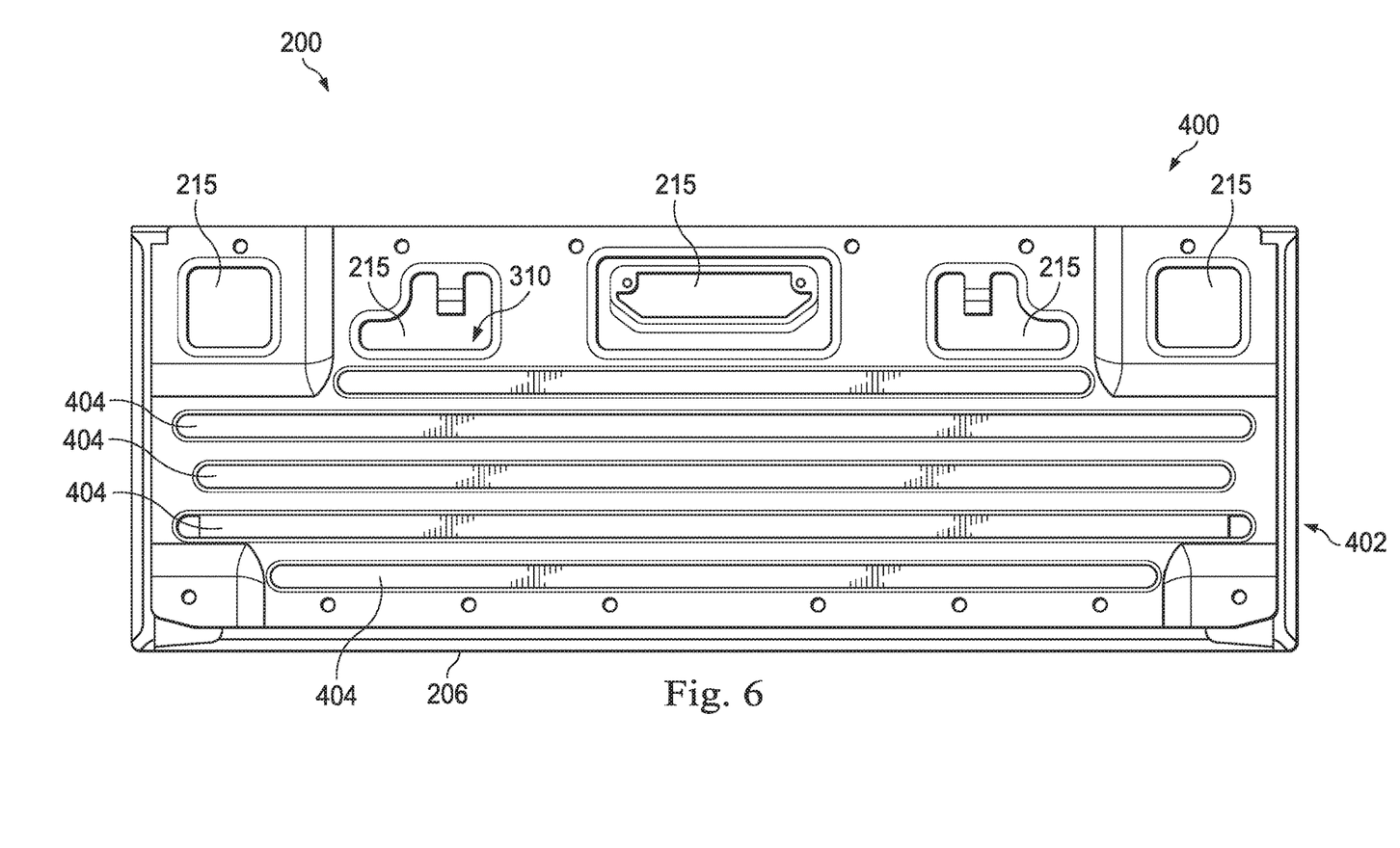
FIG. 6 is an exemplary representation of a tailgate reinforcement structure in accordance with at least one embodiment of the present disclosure.

FIG. 6 is an exemplary representation of an alternative inner panel 400 with a portion of additional tailgate reinforcement structure 402 in accordance with at least one embodiment of the present disclosure. In some examples, the inner panel 400 may cooperate with the outer panel 204 (FIG. 4) to form a tailgate in the manner described herein. Accordingly, although the bulkheads 218 are not shown in FIG. 6, the bulkheads 218 may be accommodated between the inner panel 400 and the outer panel 204. The inner panel 400 shown in FIG. 6 includes apertures 215, the top panel 208 and the bottom lip 206. In this example, the inner panel 400 also includes a plurality of laterally oriented stiffening beads 404. Since the bulkheads 218 (not pictured) located between the inner panel 400 and outer panel 204 provide stiffness in the longitudinal direction (tailgate open) or vertical direction (tailgate closed), it is advantageous in some embodiments to include these lateral beads 570 in the inner panel 400 to improve the stiffness of the tailgate in the lateral direction. In an example, this also allows for reduction of the gauge thickness (e.g., steel gauge) of the inner panel 400, which results in a significant additional mass savings as compared with the traditional tailgate reinforcement structure shown in FIG. 1. In the example shown in FIG. 6, the stiffening beads 404 may extend substantially the entire width in the transverse direction of the inner panel 400. In some implementations including the one shown in FIG. 6, the stiffening beads may appear as transverse parallel structure having the appearance of rows that are stacked where possible along the longitudinal direction of the tailgate. However, other implementations have more rows or fewer rows of stiffening beads than are shown in FIG. 6.

Figure 7:
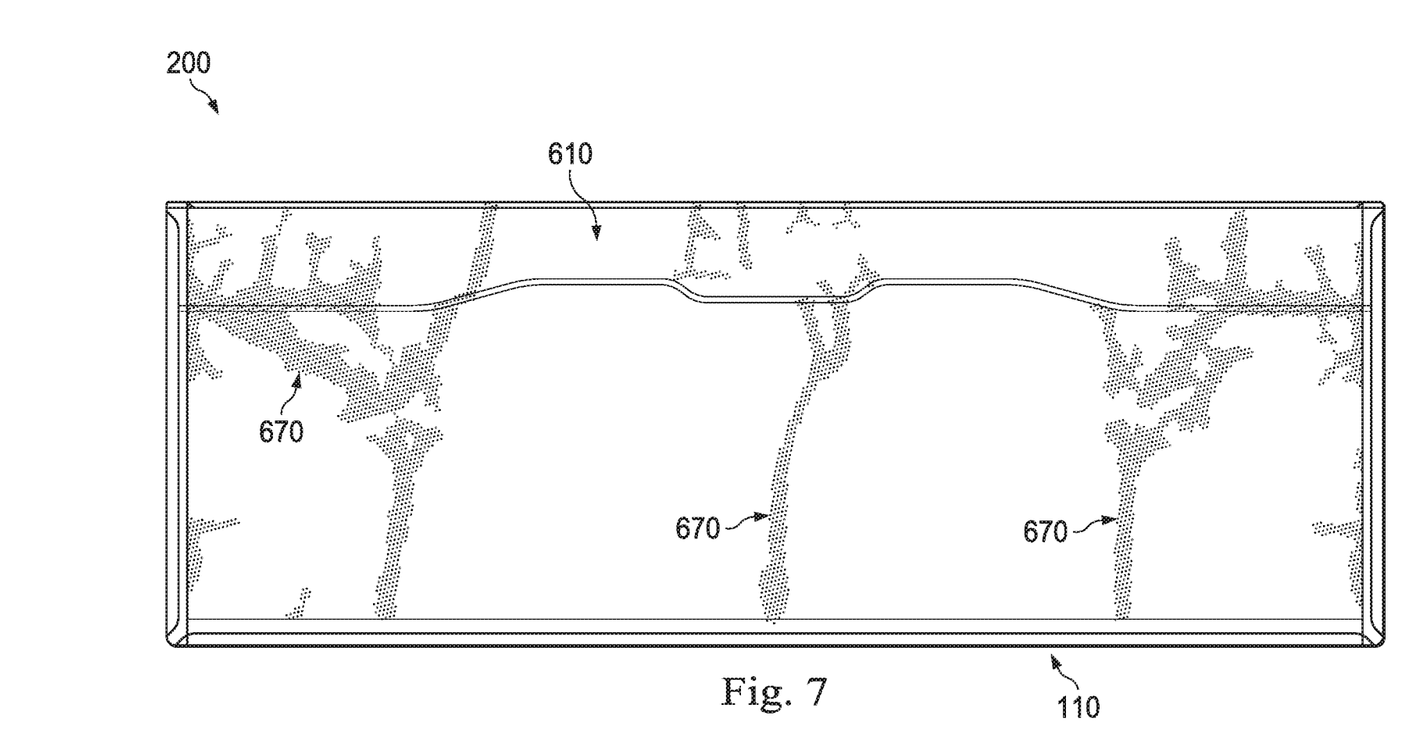
FIG. 7 is an exemplary representation of the load paths in a tailgate reinforcement structure in accordance with at least one embodiment of the present disclosure.

FIG. 7 is an exemplary representation of simulated load paths 670 in a tailgate reinforcement structure 214 (not shown in FIG. 7) in accordance with at least one embodiment of the present disclosure. In this example, a load path analysis is performed on a hypothetical solid tailgate including of the inner panel 202 and the outer panel 204, wherein the space between the two panels is completely filled with the same material as the panels. The hypothetical tailgate structure is then stressed under selected customer loading scenarios, revealing a pattern of low-stress areas 610, and high-stress areas defining the load paths 670 that equate to the pathways of the critical load path. The design of the tailgate reinforcement structure 214 is driven mainly by strength requirements, and since the analysis unexpectedly reveals load paths primarily in the vertical or longitudinal direction, it is beneficial to have the tailgate's primary reinforcement structures run in the parallel or longitudinal direction as well, or within about 30 degrees of the parallel or longitudinal direction. Accordingly, the tailgate reinforcement structure 214 described herein replaces laterally oriented spars with a plurality of vertical bulkheads 218, thus resulting in a structure that may be stronger, lighter, and better designed to accommodate the actual load paths that will occur during use of the tailgate.

In some embodiments, styling features 270 of the outer panel 204 (see FIG. 3) decrease its strength vs. what is seen for example in FIG. 1. In such cases, the designs embodied by the present disclosure are even more important, since the decrease in section in this area may cause the outer panel to bend more easily. Therefore, reinforcing the structure with vertical (when the tailgate is closed, or longitudinal when the tailgate is open) bulkheads is even more critical than would be the case otherwise.

The load path shown in FIG. 7 may relate to the inner panel and outer panel shown in FIG. 2. Different tailgate dimensions and panel designs may result in different topology optimization. However, it is believed that in most plausible loading scenarios for most tailgates, with or without styling features 270 that weaken the outer panel, the load paths are likely to run in a substantially longitudinal rather than a substantially lateral direction. As such, for tailgates in general the tailgate reinforcement structure 214 of the present disclosure (using vertical bulkheads 218) is believed to present a more optimal balance of mass and performance than that of the baseline design shown in FIG. 1 (using a lateral spar 160), and thus presents a substantial improvement in the art.

Figure 8:
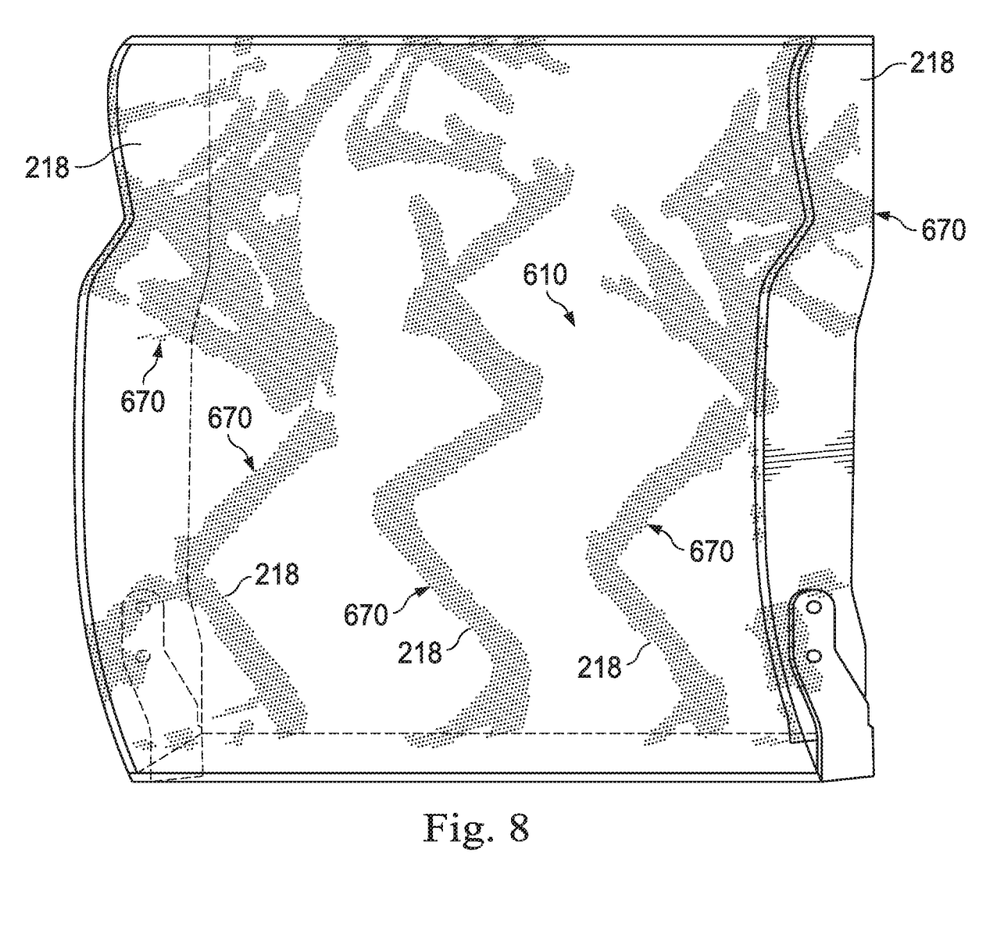
FIG. 8 is an exemplary representation of the load paths in a tailgate reinforcement structure in accordance with at least one embodiment of the present disclosure.

FIG. 8 is an exemplary representation of the load paths 670 in a tailgate reinforcement structure 214 in accordance with at least one embodiment of the present disclosure. FIG. 8 is a different view of the same load paths shown in FIG. 7. In this example, the bulkheads 218 are included in the simulated structure, and are shaped through a topology optimization process. In the example shown, multiple load cases have been applied to the tailgate at the ends, center, bottom, etc. This results in cantilever forces, shear forces, and other forces that create greater stresses in the load paths 670 near the end (or top) and sides of the tailgate, as can be seen in the FIG. 8.

Figure 9:
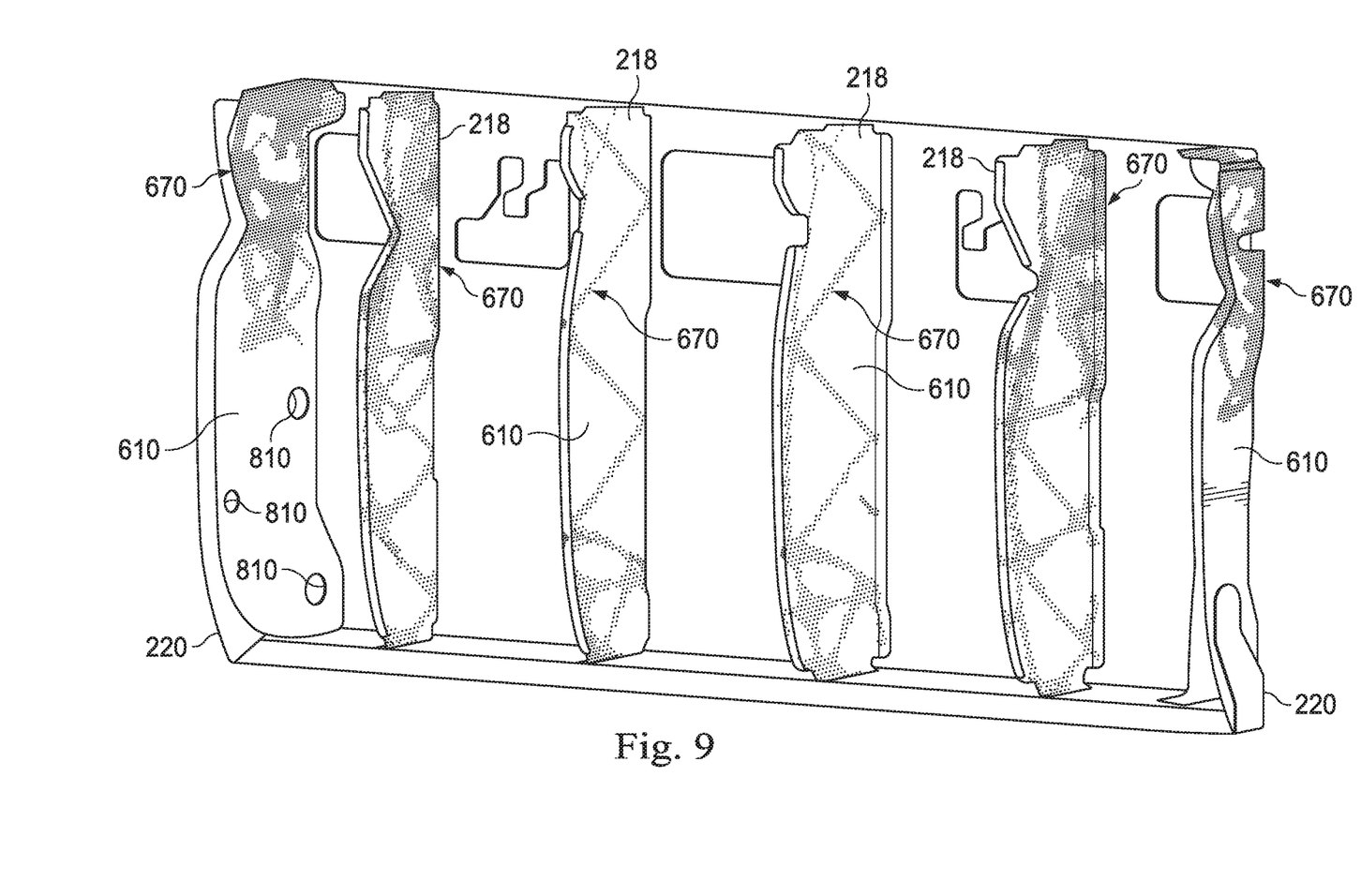
FIG. 9 is an exemplary representation of the load paths in a tailgate reinforcement structure in accordance with at least one embodiment of the present disclosure.

FIG. 9 is an exemplary representation of the load paths 670 in a tailgate reinforcement structure 214 in accordance with at least one embodiment of the present disclosure. In the example shown in FIG. 9, the placement of the bulkheads 218 is optimized between the unsupported areas across the tailgate and is left-right symmetric about the center. The number of bulkheads 218 is as needed to reduce the size of, and deformation of, unsupported areas within the tailgate based on performance targets. The bulkheads 218 are then further optimized for light-weighting by running another optimization to reveal critical load paths within the bulkheads themselves. In an example, based on the identified loading scenarios, the center bulkheads are less critical than the outer bulkheads where most of the stress is concentrated, and therefore where most of the bulkhead material is used. This results in the structure shown in FIGS. 3 and 9, wherein the outer bulkheads are solid and the inner bulkheads include lightening holes 390. Lightening holes 390 may generally be placed in the regions of low stress 610, whereas the regions of high stress in the load paths 670 are reserved as struts 395. If insufficient low-stress areas exist 610 in a given bulkhead (i.e., its volume substantially consists of high stress areas of the load paths 670), that bulkhead 218 may be defined as a solid bulkhead that includes no lightening holes 390.

In an example, additional holes 810 on edge braces 210 may be needed for assembly (e.g., bolt holes and/or a path for the lock rod), and do not exist for the purpose of lightening the edge braces 210, although they may incidentally have that effect. These will also generally occur in low-stress areas 610 as determined by the structural and mechanical needs of the assembly. In an example, the reinforcement of the lock and hinge on the side of the tailgate has been split in two to allow separate gauging as needed for further optimization.

Figure 10:
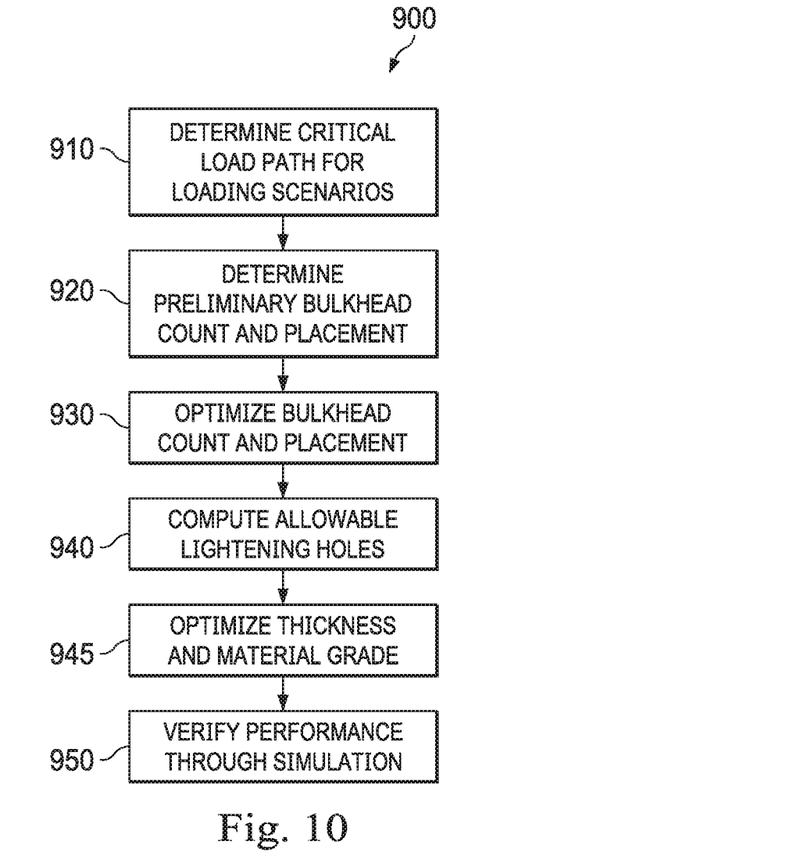
FIG. 10 is an exemplary flow diagram of a bulkhead optimization process in accordance with at least one embodiment of the present disclosure.

FIG. 10 is an exemplary flow diagram 900 of a bulkhead optimization process in accordance with at least one embodiment of the present disclosure. In step 910, the critical load path for a hypothetical tailgate is determined through FEM or any equivalent simulation process as described above in FIG. 7. It is noted that such identified critical paths represent models of reality rather than reality itself, and it is further noted that if the loading scenarios, boundary conditions, volume, styling, algorithm, or other variables are changed, the topology branches or pathways of the critical load path will also change. In an example, it may not be practical or desirable to evaluate all possible loading scenarios for a given tailgate, nor to build bulkhead structures that exactly follow the computed critical paths (which may include numerous asymmetric and otherwise idiosyncratic features as seen in FIG. 6). Thus, a degree of intuitive design understanding may be needed to interpret and apply the load path topology.

In step 920, a preliminary count and placement for the bulkheads 218 is determined, along with their gauge and material. For simplicity, the sufficient number of bulkheads required may simply be the required strength along desired axes for a given load scenario divided by the expected strength of each bulkhead (based on the gauge and material) along the desired axes, and the spacing of the bulkheads may be such that bulkheads are placed in or proximate to the pathways of the critical load path determined in step 910, or may simply be spaced at a separation based on the number of bulkheads divided by the width of the tailgate, or may be spaced according to other assembly or packaging requirements such as permitting assembly access to certain structures within the tailgate.

The bulkheads may be assumed to be solid (i.e., without lightening holes), and shaped to sit substantially flush against the inner panel 202, outer panel 204, top panel 208, and bottom lip 206, including any curves, angles, steps, or notches that may be necessary to accomplish this. The bulkheads may be further assumed to include attachment flanges and stiffening beads as described hereinabove.

In step 930, the bulkhead count and placement is optimized through FEM or any equivalent simulation process, wherein the load path analysis is performed again under various loading scenarios, with the bulkheads in place instead of a space filled with a hypothetical solid material as in step 910. If necessary or desired, the number and/or positions of the bulkheads are adjusted to distribute stresses. In many customer loading scenarios, stresses are greater near the sides of a tailgate.

In step 940, areas of low stress and areas of high stress are identified within the bulkheads 218 based on FEM analysis or any equivalent simulation process, and mass is removed from the design in the areas of low stress. For some bulkheads, this may result in no removal, i.e., a solid bulkhead design with no lightening holes 390. For other bulkheads, this may result in a truss-like structure with substantially triangular lightening holes 390 alternating with substantially linear struts 395 as shown for example in FIG. 5. It is noted that other patterns of lightening holes may be used, such as grids, honeycombs, patterns of circular holes, etc.

In step 945, the thickness and material grade of the bulkheads are optimized. This optimization may be based on performance, cost, mass, or any combination thereof. For example, if it is desired to provide an extra margin, the thickness or material grade of the bulkhead material may be increased. If it is desired to reduce the margin in order to save mass or cost, the thickness or material grade of the bulkhead may be decreased.

In step 950, a final simulation step (e.g., FEM) is performed, to verify that the final structure meets all defined structural requirements (i.e., a desired level of strength or stiffness) for all defined loading scenarios. It is noted that the optimal tailgate reinforcement structure will be different for different tailgate dimensions, different styling features 270 of the outer panel 204, different bead patterns of the inner panel 202, and different customer loading scenarios.

It is further noted that different bulkheads in a given tailgate reinforcement structure may be optimized separately if desired. Based on design considerations, it may be more beneficial in terms of weight, strength, and other variables to have a larger number of lightweight bulkheads, or a smaller number of more robust bulkheads, or a mixture of lightweight and robust bulkheads. Bulkheads may have a flat cross section, or may have a more complex cross section such as a Z, top-hat, etc., that provides greater cross-sectional area and support. The spacing of the bulkheads across the width of the tailgate need not be equal to the number of bulkheads divided by the width of the tailgate. Rather, depending on the implementation it may be desirable to have more bulkheads toward the edges and fewer toward the center, or vice versa.

Accordingly, it can be seen that the mass and performance optimized tailgate reinforcement structure fills a long-standing need in the art, by permitting future tailgates to be simultaneously lighter, stronger, and stiffer than previously existing tailgates.

A number of variations are possible on the examples and embodiments described above. For example, each bulkhead may be fashioned from more than one piece, or may be formed monolithically (i.e., as a single piece). The various components may be made from metals such as steel or aluminum, from polymers and plastics, from ceramics, from composites such as carbon fiber or fiberglass, or even in some cases from biological products such as wood, bamboo, or laminated paper. The technology described herein may be produced by various means including but not limited to folding, forging, casting, sintering, milling, stamping, and 3D printing. The top boundary of the tailgate may be a top panel, or may comprise an upper lip on either or both of the inner and outer panels. The bottom boundary of the tailgate may be a bottom panel, or may comprise a lower lip on either or both of the inner and outer panels. The left and right boundaries of the tailgate may be separate panels or edge braces, or may comprise left and right lips on either or both of the inner and outer panels.

The logical operations making up the embodiments of the technology described herein are referred to variously as operations, steps, objects, elements, components, or modules. Furthermore, it should be understood that these may be performed in any order, unless explicitly claimed otherwise or a specific order is inherently necessitated by the claim language. In some implementations, components such as bulkheads may be formed as part of other components such as the inner panel, top panel, or outer panel. It should further be understood that some vehicles other than trucks may be equipped with tailgates, and that the described technology may be employed in other automobile components including doors, hatchbacks, and body panels.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the mass and performance optimized tailgate reinforcement structure. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide a complete description of the structure and use of exemplary embodiments of the mass and performance optimized tailgate reinforcement structure as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter. For example, the mass and performance optimized tailgate reinforcement structure may also include energy-absorbing or energy-dissipating properties for crash safety, or noise and vibration suppression characteristics for passenger comfort. Additionally, the optimization of the bulkheads may include non-standard load paths that exceed recommended parameters of vehicle use, or that describe atypical (e.g., highly asymmetrical) loading scenarios.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A tailgate for a vehicle having structural strength and stiffness, comprising:
    a tailgate outer panel;
    a tailgate inner panel facing the outer panel;
    a top boundary extending between the outer panel to the inner panel;
    a bottom boundary extending between the outer panel to the inner panel;
    a left boundary extending between the outer panel to the inner panel;
    a right boundary extending between the outer panel to the inner panel;
    a volume of space defined within the inner panel, bottom boundary, outer panel, top boundary, left boundary, and right boundary; and
    a plurality of bulkheads disposed within the volume of space, each bulkhead of the plurality of bulkheads extending in a linear direction a complete distance between the bottom boundary and the top boundary of the inner panel in a manner providing strength and stiffness to the outer and inner panels, wherein each bulkhead of the plurality of bulkheads comprises:
        an inner flange that abuts against the inner panel;
        an outer flange that abuts against the outer panel;
        a bottom flange that abuts against the bottom boundary; and
        a top flange that abuts against the top boundary.

2. The tailgate for a vehicle of claim 1, further comprising a plurality of laterally oriented stiffening beads disposed within a surface of the inner panel.

3. The tailgate for a vehicle of claim 1, further comprising a pattern of stiffening beads or struts and lightening holes within one or more of the plurality of bulkheads.

4. The tailgate for a vehicle of claim 3, wherein the lightening holes occur outside a predicted load path for at least one customer loading scenario.

5. The tailgate for a vehicle of claim 1, wherein the plurality of bulkheads are attached to the outer panel, inner panel, top boundary, or bottom boundary by at least one of welds, solder, bolts, screws, rivets, clips, adhesives, friction fit, or interference fit.

6. The tailgate for a vehicle of claim 1, wherein the plurality of bulkheads are formed as part of one or more of the inner panel, outer panel, and top boundary.

7. The tailgate for a vehicle of claim 1, further comprising one or more straps that sit flush against the inner or outer panel and reach substantially from the left boundary to the right boundary, or a portion thereof.

8. The tailgate for a vehicle of claim 1, further comprising one or more lateral braces positioned flush against the inner or outer panel, such that each lateral brace is flush against two of the plurality of bulkheads.

9. A system for reinforcing a tailgate, comprising:
    a tailgate outer panel;
    a tailgate inner panel;
    a top boundary;
    a bottom boundary;
    a left boundary;
    a right boundary;
    a volume of space defined within the inner panel, bottom boundary, outer panel, top boundary, left boundary, and right boundary;
    a plurality of bulkheads disposed within the volume of space and reaching from the bottom boundary to the top boundary of the inner panel,
    wherein each bulkhead comprises:
        an inner flange that fits against the inner panel;
        at least one outer flange that fits against the outer panel;
        a bottom flange that fits against the bottom boundary;
        a top flange that fits against the top boundary; and
        one or more stiffening beads between one or more of the inner or outer edges.

10. The system of claim 9, further comprising a pattern of stiffening beads or struts and lightening holes within one or more bulkheads of the plurality of bulkheads, wherein positions of the lightening holes are not within the predicted load path.

11. The system of claim 9, wherein the plurality of bulkheads is attached to the outer panel or inner panel by at least one of welds, solder, bolts, screws, rivets, clips, adhesives, friction fit, or interference fit, or are formed as part of one or more of the inner panel and outer panel.

12. The system of claim 9, further comprising one or more of:
    one or more straps positioned flush against the inner or outer panel and reach substantially from the left boundary to the right boundary; and
    one or more lateral braces positioned flush against the inner or outer panel, such that each lateral brace is flush against two of the plurality of bulkheads.

13. The system of claim 9, further comprising a plurality of laterally oriented stiffening beads disposed within a surface of the inner panel.

14. The system of claim 9, wherein a shape of each bulkhead is such that each bulkhead fits flush against both the inner panel and outer panel.

15. The tailgate for a vehicle of claim 1, wherein the inner flange of at least one bulkhead is attached to the inner panel.

16. The tailgate for a vehicle of claim 1, wherein the outer flange of at least one bulkhead is attached to the outer panel.

17. The tailgate for a vehicle of claim 1, wherein the top flange of at least one bulkhead is attached to the top boundary.

18. The tailgate for a vehicle of claim 1, wherein the bottom flange of at least one bulkhead is attached to the bottom boundary.

\* \* \* \* \*